US011620581B2

(12) United States Patent
Givental et al.

(10) Patent No.: US 11,620,581 B2
(45) Date of Patent: Apr. 4, 2023

(54) MODIFICATION OF MACHINE LEARNING MODEL ENSEMBLES BASED ON USER FEEDBACK

(71) Applicant: International Business Machines Corporation, Armonk, NY (US)

(72) Inventors: Gary I. Givental, Bloomfield Hills, MI (US); Aankur Bhatia, Bethpage, NY (US); Lu An, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 16/811,054

(22) Filed: Mar. 6, 2020

(65) Prior Publication Data
US 2021/0279644 A1 Sep. 9, 2021

(51) Int. Cl.
| G06F 18/22 | (2023.01) |
| G06N 20/20 | (2019.01) |
| G06F 18/214 | (2023.01) |
| G06F 18/21 | (2023.01) |
| G06F 18/2321 | (2023.01) |
| G06N 3/044 | (2023.01) |

(52) U.S. Cl.
CPC ......... *G06N 20/20* (2019.01); *G06F 18/2155* (2023.01); *G06F 18/2178* (2023.01); *G06F 18/22* (2023.01); *G06F 18/2321* (2023.01); *G06N 3/044* (2023.01)

(58) Field of Classification Search
None
See application file for complete search history.

(56) References Cited

U.S. PATENT DOCUMENTS

| 9,112,895 B1 | 8/2015 | Lin |
| 9,323,837 B2 | 4/2016 | Zhao et al. |
| 9,349,103 B2 | 5/2016 | Eberhardt, III et al. |
| 9,652,354 B2 | 5/2017 | Filimonov et al. |

(Continued)

FOREIGN PATENT DOCUMENTS

WO WO2018177247 A1 10/2018

OTHER PUBLICATIONS

Alghanmi, Nusaybah et al., "HLMCC: A Hybrid Learning Anomaly Detection Model for Unlabeled Data in Internet of Things", IEEE Access, vol. 7, pp. 179492-179504, doi:10.1109/ACESS.2019.2959739, Nov. 2019.

(Continued)

*Primary Examiner* — Tahmina N Ansari
(74) *Attorney, Agent, or Firm* — Stephen J. Walder, Jr.; Jeffrey S. LaBaw

(57) ABSTRACT

Mechanisms are provided to implement an ensemble of unsupervised machine learning (ML) models. The ensemble of unsupervised ML models processes a portion of input data to generate an ensemble output and the ensemble output is output to an authorized user computing device to obtain user feedback from the authorized user via the user computing device. The user feedback indicates a correctness of the ensemble output. The mechanisms modify at least one feature of the ensemble of unsupervised ML models based on the obtained user feedback to thereby generate a modified ensemble of unsupervised ML models. Subsequent portions of input data are then processed using the modified ensemble of unsupervised ML models.

20 Claims, 5 Drawing Sheets

(56) References Cited

U.S. PATENT DOCUMENTS

| | | |
|---|---|---|
| 10,392,022 B1 | 8/2019 | Rau |
| 10,795,753 B2 | 10/2020 | Xu et al. |
| 10,884,842 B1 | 1/2021 | Ramachandran Vijayalekshmi et al. |
| 11,374,953 B2* | 6/2022 | Givental .................. G06F 16/55 |
| 2010/0241596 A1* | 9/2010 | Lee .......................... G06N 5/04 706/46 |
| 2011/0296244 A1 | 12/2011 | Fu et al. |
| 2015/0047040 A1 | 2/2015 | Cobb et al. |
| 2015/0269050 A1 | 9/2015 | Filimonov et al. |
| 2016/0196174 A1 | 7/2016 | Jacob |
| 2016/0217022 A1 | 7/2016 | Velipasaoglu et al. |
| 2016/0224898 A1 | 8/2016 | Ryckbosch et al. |
| 2018/0004948 A1 | 1/2018 | Martin et al. |
| 2018/0096261 A1 | 4/2018 | Chu et al. |
| 2018/0113773 A1 | 4/2018 | Krishnan et al. |
| 2018/0316707 A1* | 11/2018 | Dodson .................. H04L 41/40 |
| 2018/0349605 A1 | 12/2018 | Wiebe et al. |
| 2018/0367561 A1 | 12/2018 | Givental et al. |
| 2019/0087737 A1 | 3/2019 | Pendar et al. |
| 2019/0243743 A1 | 8/2019 | Saxena et al. |
| 2019/0278684 A1 | 9/2019 | Dede et al. |
| 2019/0324831 A1 | 10/2019 | Gu |
| 2019/0037061 A1 | 12/2019 | Batoukov et al. |
| 2020/0073738 A1 | 3/2020 | Gaida |
| 2020/0349169 A1 | 11/2020 | Venkatesan et al. |
| 2021/0026722 A1 | 1/2021 | Bhatia et al. |
| 2021/0166140 A1 | 6/2021 | Cheng et al. |
| 2021/0264025 A1* | 8/2021 | Givental ................ G06F 21/577 |
| 2021/0279644 A1* | 9/2021 | Givental ................ G06K 9/6259 |
| 2021/0281592 A1* | 9/2021 | Givental ................ G06N 20/10 |

OTHER PUBLICATIONS

Chen, Xiaoliang et al., "Self-Taught Anomaly Detection with Hybrid Unsupervised/Supervised Machine Learning in Optical Networks", Journal of Lightwave Technology, vol. 37, No. 7, pp. 1742-1749, Apr. 2019.

Ruff, Lukas et al., "Deep Semi-Supervised Anomaly Detection", ICLR Conference, arXiv preprint arXiv:1906.02694, pp. 1-23, Jun. 2019.

Zhu, Xiaojin, "Semi-Supervised Learning Literature Survey", Computer Science Technical Report 1530, University of Wisconsin, Madison, Accessed at https://pages.cs.wisc.edu/~jerryzhu/pub/ssl_survey.pdf, pp. 1-60, Jul. 2008.

List of IBM Patents or Patent Applications Treated as Related, Apr. 16, 2020, 2 pages.

Mell, Peter et al., "The NIST Definition of Cloud Computing", The National Institute of Standards and Technology, U.S. Department of Commerce, Special Publication 800-145, Sep. 2011, 7 pages.

Yang, Xinzhu et al., "Dynamic Weighting Ensembles for Incremental Learning", Chinese Conference on Pattern Recognition, Nov. 4-6, 2009, 5 pages.

* cited by examiner

MODIFICATION OF MACHINE LEARNING MODEL ENSEMBLES BASED ON USER FEEDBACK

BACKGROUND

The present application relates generally to an improved data processing apparatus and method and more specifically to mechanisms for modifying features of machine learning model ensembles based on user feedback.

Anomaly detection plays an important role in security management of modern computer system environments. Telemetry data, i.e. data collected at remote points with subsequent automatic transmission of the data to receiving equipment for monitoring, emitted by various security and endpoint computing devices is often used for such anomaly detection, where this data is often packaged as computer system log data structures, or entries into computer system log data structures (also referred to simply as "computer system logs" or just "logs").

To perform such anomaly detection, human security analysts review the computer system logs, such as via a Security Information and Event Management (SIEM) computing system, such as the IBM QRadar™ SIEM computing system available from International Business Machines (IBM) Corporation of Armonk, N.Y., using a rule engine and search mechanism. This manual process may operate well for small sized enterprises and managed security services providers (MSSPs), however with the increasing volume of data traffic associated with computing resources, there is an explosive growth of computer system log volumes making it impractical for a human security analyst to be able to review the computer system logs and identify anomalies accurately. In fact, even SIEM computing systems are often quite noisy in their application of the rules of the rule engine and application of search criteria, generating a large number of false positives that require human security analyst review. Moreover, rules-based and search-based SIEM computing systems require a large amount of manual tuning and codification by human security analysts of their own knowledge of what to look for when attempting to identify anomalies.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the memory comprising instructions executed by the at least one processor to cause the at least one processor to implement an ensemble of unsupervised machine learning (ML) models. The method comprises processing, by the ensemble of unsupervised ML models, a portion of input data to generate an ensemble output and outputting the ensemble output to an authorized user computing device to obtain user feedback from the authorized user via the user computing device. The user feedback indicates a correctness of the ensemble output. The method further comprises modifying at least one feature of the ensemble of unsupervised ML models based on the obtained user feedback to thereby generate a modified ensemble of unsupervised ML models. In addition, the method comprises processing subsequent portions of input data using the modified ensemble of unsupervised ML models.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
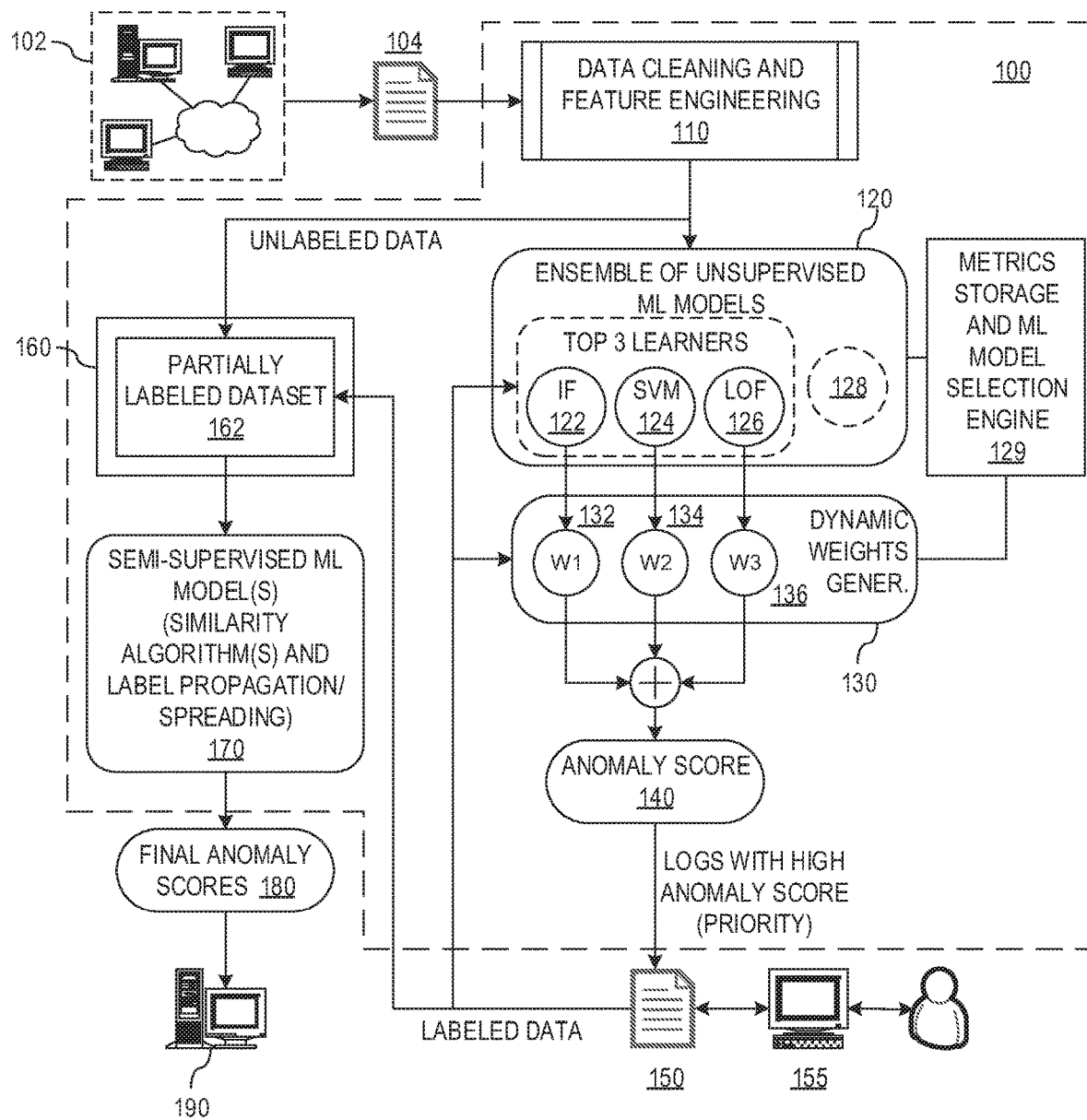
FIG. 1 is an example block diagram illustrating primary operational elements of an improved computing tool according to one illustrative embodiment.

As mentioned above, using human security analyst review of computer system logs for anomalies is fast becoming an impracticality as the amount of data traffic flowing to and from computing system resources increases with the increased reliance on computing systems to provide desired functionalities. That is, as the data traffic increases, the complexity and volume of the computing system logs generated for purpose of security and evaluation of proper functioning of the monitored computing system environment, also increases. Even known Security Information and Event Management (SIEM) systems often suffer from significant drawbacks due to false positives, manual tuning, representation of human security analyst knowledge, and the like.

To reduce manual efforts, machine learning based anomaly detection mechanisms may be implemented where a computer executed machine learning model, such as a convolutional neural network (CNN), deep neural network (DNN), recurrent neural network (RNN), or other type of machine learning model. The process of training a machine learning (ML) model involves providing an ML algorithm (that is, the learning algorithm) with training data to learn from. The term "ML model" refers to the model artifact that is created by the training process. The training data contains the correct answer, which is known as a target or target attribute, and is also sometimes referred to as the "ground truth", such that the learning algorithm executes the ML model on the training data, generates an output based on the execution of the ML model on the training data, calculates a loss or error of the ML model relative to the correct answer, and then adjusts parameters of the ML model so as to reduce this loss or error. That is, the learning algorithm finds patterns in the training data that map the input data attributes to the target (the answer that the ML model should predict), and the learning algorithm outputs a trained ML model that captures these patterns.

While machine learning based anomaly detection mechanism may be implemented, in order to achieve high detection accuracy, supervised machine learning algorithms still need a large amount of effort from the human security analysts to manually label historical computer system logs and potential threats for up-front model training, i.e. for generation of the training data. Although unsupervised machine learning algorithms do not require manual effort on labeling the historical computer system log data, the accuracy of anomaly detection with fully unsupervised machine learning is very unstable and false positive rates are high. Moreover, due to the changing patterns of security attacks, a fixed machine learning model cannot handle new cases and will likely generate a large volume of false negatives and false positives when the machine learning model is exposed to new patterns of data in computer system logs that the machine learning model has not previously encountered, i.e. patterns of data that are significantly different from the patterns of data in the training data.

The illustrative embodiments, on the other hand, leverage the strengths of both supervised and unsupervised machine learning in a hybrid approach to training a machine learning model to detect anomalies in computer system log data structures. That is, the illustrative embodiments combine unsupervised and supervised machine learning in a specific manner to provide a computer machine learning model that is able to detect anomalies in log data structures. With these mechanisms, the log data structure is first parsed and processed into structured data of a predetermined format. For example, one format of structured data into which a log data structure may be parsed may include the following fields: timestamp, unique log id, customer, device, vendor, source IP, destination IP, event name, source port, destination port, raw payload, and a key/value map of optionally parsed attributes such as URL, username, etc. It should be appreciated that this parsing and converting to a predetermined format may be done with regard to log data structures having different native formats and the pre-determined format may provide a common or universal format which is usable by downstream processes, such as an ensemble of machine learning models, as discussed hereafter.

That is, an ensemble of a plurality of machine learning models trained using unsupervised machine learning algorithms, e.g., isolation forest, local outlier factor, one-class support vector machine (SVM), and/or the like, are generated with dynamic weighting. An example of a machine learning ensemble with dynamic weighting is described, for example, in Yang et al., "Dynamic Weighting Ensembles for Incremental Learning," Chinese Conference on Pattern Recognition, Nov. 4-6, 2009. The ensemble of unsupervised machine learning models is used on input data, such as the log data structure information stored in the pre-determined format data structure, to generate an initial output indicating a likelihood that an event represented in the log data is actually anomalous.

Based on the initial output generated by the ensemble specifying a likelihood, or probability, that an event in the log data is anomalous, the events in the log data that have a high likelihood or probability (as measured by comparing the likelihood output of the ensemble to one or more predetermined threshold values) are provided to a human security analyst via a user interface output on a computing device associated with the security analyst, so that they may review and label the input log data as either anomalous or not anomalous, e.g., "true threat" or "false positive." The human security analyst response is stored in a training data database along with the unlabeled input log data for use as training data for training an anomaly detection machine learning model, i.e. performing supervised machine learning of an anomaly detection machine learning model. Thus, the training data in the training data database comprises a hybrid of unlabeled log data and labeled log data, i.e. this hybrid is a partially labeled data set.

The partially labeled data set is input to a semi-supervised machine learning model so that the semi-supervised machine learning model labels the unlabeled portion of the partially labeled data set based on similarities of the unlabeled data with labeled data in the partially labeled data set. The newly detected log data having generated labels with high likelihood of representing anomalies are again sent to a human system analyst for review and responsive action.

In addition to the partially labeled data set being sent to the semi-supervised machine learning model, the feedback from the human security analysts with regard to the results of the ensemble unsupervised machine learning model labeling of the training data, i.e. the responses provided by the human security analysts in response to the user interface outputs generated for high likelihood anomalous log data, are provided to a dynamic weight generator to determine which unsupervised machine learning model(s) in the ensemble provided the most accurate outputs, e.g., most accurate classifications of logged events as "true threat". The dynamic weight generator executes a weight generator supervised machine learning model, e.g., SVM, neural networks, etc., to assign weights to the top N number of machine learning models in the ensemble, where N is any desirable number of machine learning models for the particular implementation, e.g., top 3 machine learning models, where the "top" number refers to the models with a predetermined specified level of performance, e.g., the highest accuracy relative to all the models in the ensemble. These dynamically determined weights are then used thereafter for predicting new data using the ensemble unsupervised machine learning operation described previously.

Thus, the illustrative embodiments provide a mechanism that combines unsupervised and supervised machine learning to provide accurate anomaly detection in computer system log data structures. The mechanisms of the illustrative embodiments reduce the manual effort spent on labeling data for initial training of machine learning models by allowing the ensemble of unsupervised machine learning models to operate on unlabeled data, their results used to train a semi-supervised machine learning model to generate a classification output, and the feedback from the human analysts being used to generate dynamic weights for the machine learning models in the ensemble so as to make their classification outputs used by the semi-supervised machine learning model more accurate.

The mechanisms of the illustrative embodiments improve the efficiency and effectiveness of detecting target classifications, e.g., detecting computer system security threats/attacks, unauthorized accesses to computing system resources, etc., without having to use explicitly defined rules in a rules engine and/or searches. The mechanisms of the illustrative embodiments also reduce the manual efforts on identifying false positives generated by the ensemble of unsupervised machine learning models in that the analyst is only reviewing results the first time so as to provide labels to the unsupervised machine learning model, with subsequent results not needing to be reviewed by the human analyst. The potential for additional reduction in false positives comes from the fact that once the system is in production, the analysts' reviews both teach the system as well as earn the trust of the analysts for how the system is labelling "false positives". As that trust is built, the analysts no longer have to examine every log and high-confidence anomalies can be automatically actioned as noise or true threats.

Moreover, the high classification accuracy, e.g., anomaly detection accuracy, improves the computer system security coverage with regard to classifying outliers that are different from the training data. The reason the computer system security coverage is improved is due to fact that no human analyst can actually review every single log, nor can a security rule be written that covers all the possible threat scenarios, given the high volume of traffic on any sufficiently large enterprise customer network. Thus, all modern STEM systems and SOC operators do their best to review threats, but with a "best effort" mindset. Having a per-log anomaly score mechanism, such as that of the illustrative embodiments, allows far greater coverage for threats by virtue of automated analysis of every single log.

It should be appreciated that while the primary illustrative embodiments are described in the context of analyzing computer system log data structures to identify events in the computer system log data structures indicative of anomalous events possibly associated with computer security threats/attacks, unauthorized accesses to computing system resources, or any other logged events of particular interest, the illustrative embodiments are not limited to such. Rather, the illustrative embodiments may be implemented in a variety of different computing system environments for performing classifications of event patterns in input data indicative of a particular classification of interest. For example, in a medical field, the combined unsupervised/supervised machine learning model mechanisms of the illustrative embodiments may be used as a basis for classifying medical image data that is input to the mechanisms of the illustrative embodiments, with regard to whether or not anomalous regions are present in the medical image data, such as cancerous tumors, blockages in blood vessels, or any other medical anomaly that may be detected in medical images. Thus, the mechanisms of the illustrative embodiments may be used to identify medical images as anomalous or not and provide the anomalous medical image data to a radiologist or other appropriate personnel for evaluation. In this way, the semi-automated mechanisms of the illustrative embodiments may be utilized to assist radiologists and other appropriate personnel by focusing their attention on only the medical image data where anomalies are likely present. This is only one other possible implementation of the mechanisms of the illustrative embodiments. Many others exist where such anomaly classification may be performed using the improved computer tool of the illustrative embodiments.

Before discussing the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example block diagram illustrating primary operational elements of an improved computing tool according to one illustrative embodiment. For purposes of the present description, it will be assumed that the illustrative embodiments are being implemented as part of a computer security mechanism and specifically are directed to detecting anomalies in computing system or computing resource security event log data. However, as noted above, this is only one possible implementation falling within the scope of the illustrative embodiments, and is not intended to be limiting on the present invention. Other implementations in which anomalous patterns within input data may be identified, may also be used without departing from the spirit and scope of the present invention.

As shown in FIG. 1, the a monitored computing system environment 102 comprises a plurality of computing system resources, such as computing devices, software executing on computing devices, data storage systems, data network components, e.g., switches, routers, etc., and any other known or later developed computing system resources from which and/or about which log data is generated, such as security event logs that may store access log data, for example. Computer system resource event logging and the creation of log data structures is generally known in the art and thus, a more detailed description is not provided herein. As one example of a computer system that logs events and creates log data structures, reference is made to IBM QRadar™, available from International Business Machines (IBM) Corporation of Armonk, N.Y.

The computer resource log data 104 is transmitted, such as via one or more data networks (not shown), to the hybrid machine learning (ML) anomaly detector 100 of the illustrative embodiments. The hybrid ML anomaly detector 100 comprises a data cleaning and feature engineering engine 110, an unsupervised machine learning model ensemble 120, a dynamic weights generator 130, and a semi-supervised ML model 170. The hybrid ML anomaly detector 100 of the depicted illustrative embodiment operates in conjunction with a Security Information and Event Management (STEM) computing system 190, and potentially other security analyst computing devices 155. In some illustrative embodiments, these computing systems 100, 155, and 190, as well as the computing resources in the monitored computing system environment 102, may be separate computing systems or separate computing devices. In other illustrative embodiments, one or more of these computing systems 100, 155, and 190, as well as some of the computing resources in the monitored computing system environment 102, may be combined or integrated with one another into a single computing system or computing device. For example, in some illustrative embodiments, the hybrid ML anomaly detector 100 may be integrated with the STEM computer system 190 as an integrated improved STEM computing tool. In some illustrative embodiments, the security analyst computing device 155 may be integrated with the STEM computer system 190, or may be used to access the STEM computer system 190 to provide security analyst feedback as described hereafter. Any desired separation or combination of computing systems shown in FIG. 1 may be implemented without departing from the spirit and scope of the present invention.

As shown in FIG. 1, the log data structures 104 obtained from the monitoring agents monitoring computing resources in the monitored computing environment 102 are first processed by the data cleaning and feature engineering engine 110 so as to convert log data of different formats into a predetermined common format that is able to be used as input to the unsupervised machine learning model ensemble 120. That is, depending on the particular computing resources being monitored, the particular monitoring agents being employed, and the particular events being logged, the log data structures 104 may have differently formatted logged data A common, "normalized" log format is utilized in order to forego the variety of data formats across vendor-specific security devices. A normalized log allows any downstream system to know how to read attributes such as IPs, event names, ports, etc.

The data cleaning and feature engineering engine 110 parses the log data and converts the log data into a commonly structured data frame. Feature engineering is performed on the converted log data to drop useless features, e.g., implementing a "dropna" algorithm or the like, and extract new features to supplement the existing feature set present in the converted log data so as to represent the individual event logs. Missing data imputation may also be implemented, such as a "fillna" algorithm or the like, to impute missing data in the data frame. An example of missing data imputation may include filling in the geolocation of an attacker IP address, adding the customer industry, mapping the vendor categorization of the event to an agreed upon framework, such as MITRE Att&ck, or the like.

Additional data cleaning and feature engineering operations may be performed by the data cleaning and feature engineering engine 110 so as to format and extract features from the log data 104 for input to the unsupervised machine learning models 122-128 of the unsupervised machine learning model ensemble 120. For example, the data cleaning and feature engineering engine 110 may perform feature splitting and feature encoding adopting a label encoder algorithm to convert categorical variables into numerical values. Thus, the data cleaning and feature engineering engine 110 combines all required function in order to take a vendor-specific payload in a vendor-specified format and parse that down to a set of normalized fields, adding new fields (such as Geolocation), and splitting all attributes of the log into key/value pairs, so that they can be further extracted for use in the machine learning platform. In some illustrative embodiments, a one-hot encoding algorithm may be implemented to encode features whose values are lists and not single categorical values.

Thus, the input provided to the ensemble 120 comprises a set of encoded features extracted from the log data structures after conversion to a common format. The data cleaning and feature engineering engine 110 provides this input to both the ensemble 120 of unsupervised machine learning models 122-128 as input, and to a training data database 160 for inclusion in a partially labeled training dataset 162 as unlabeled training data. The partially labeled training dataset 162 is used to train the semi-supervised machine learning model 170, as described hereafter.

As shown in FIG. 1, an ensemble 120 of a plurality of machine learning models 122-128 are trained using unsupervised machine learning algorithms, e.g., isolation forest, local outlier factor, one-class support vector machine (SVM), and/or the like. The resulting machine learning models, e.g., isolation forest ML model 122, one-class SMV ML model 124, local outlier factor ML model 126, and other ML models 128, or a subset of the machine learning models 122-128, such as a "top X models" where X is any desired integer value, e.g., where X=3, ML models 122-126 may be selected, each operate on input data from the data cleaning and feature engineering engine 110 to generate an output result.

The evaluation of the ML models for selection in the subset of ML models may be performed using any suitable performance evaluation for the particular implementation. For example, metrics may be maintained for each of the ML models with regard to their accuracy and/or precision in predicting classifications or labels for the inputs, as well as other performance metrics, and these metrics may be used as a basis for selecting the X number of ML models, e.g., X ML models having a relatively highest accuracy amongst the plurality of ML models 122-128. Initially, a subset of ML models may be randomly selected, manually selected by a security analyst, or the like, as an initial subset of ML models. Thereafter, the accumulated performance metrics may be maintained by the hybrid machine learning (ML) anomaly detector 100, such as in the metrics storage and ML model selection engine 129, which also comprises the computer implemented logic for dynamically and automatically selecting a subset of ML models for inclusion in the ensemble 120.

With regard to dynamically and automatically selecting a subset of ML models to include in the ensemble of unsupervised ML models 120, the metrics storage and ML model selection engine 129 may determine when the performance of an unsupervised ML model, e.g., unsupervised ML model 126, in the ensemble 120 is providing poor performance and may automatically replace this unsupervised ML model 126 with another unsupervised ML model, e.g., unsupervised ML model 128, in the available plurality of unsupervised ML models 122-128. For example, threshold performance metric values may be established indicating an acceptable level of performance by the unsupervised ML models with regard to one or more performance metrics, e.g., accuracy, precision, etc. If an unsupervised ML model in the ensemble 120 has an accumulated performance metric that equals or falls below the predetermined threshold value, then the unsupervised ML model may be removed from the ensemble 120 and/or replaced by another available unsupervised ML model. The modification to the ensemble 120 may also be communicated to the dynamic weights generator 130 so that corresponding weight values for the removed/replaced unsupervised ML model may be updated to reflect the removal/replacement. For example, the weight value associated with the removed unsupervised ML model may be removed from the set of weights applied to the outputs of the unsupervised ML models in the ensemble 120, and if the unsupervised ML model is replaced, a corresponding weight for the replacement unsupervised ML model may be instigated in the set of weights, or a default weight value may be set for the replacement unsupervised ML model.

The output results of the unsupervised ML models 122-128 or a subset of unsupervised ML models 122-126, which are included in the in the ensemble 120 indicate, for the corresponding unsupervised ML model, the predicted classification of the input data generated by the evaluation of the combination of input features by that particular unsupervised ML model, e.g., each unsupervised ML model may predict whether the particular combination or pattern of features in the input data represent an anomaly or non-anomalous data. Again, in the case of an implementation directed to identifying potential security threats/attacks, unauthorized accesses, or the like, the indication of the input data representing an anomaly indicates that the input data indicates a security threat/attack or unauthorized access to computing system resources, and an output of non-anomalous indicates that the input data does not represent a security threat/attack or unauthorized access. The output may be a binary output for configurations where there is only an indication of one class or a second class, e.g., "anomalous" or "non-anomalous", or may be a vector output having multiple vector slots in excess of two, each associated with a different classification. In some cases, the output may comprise one or more values representing a confidence or probability that the corresponding classification is correct, e.g., an output value of 0.85 indicates an 85% confidence or probability that the corresponding classification, e.g., anomalous, is a correct classification for the input data.

It should be appreciated that this output may be correct or incorrect. Thus, an output of "anomaly" or "anomalous" may represent a "true threat" or a "false positive." Similarly, an output indicating "normal" or "non-anomalous" may likewise be correct/incorrect and thus, may represent a "non-threat" or a "false negative." In some illustrative embodiments, instances of outputs of the unsupervised machine learning models indicating potential security threats/attacks, unauthorized accesses, or the like, may be sent to a human security analyst, such as via a graphical user interface and workstation or other computing device associated with the human security analyst, so that the human security analyst may verify whether the input is actually a true threat or false positive. The human security analyst may then provide an input via the graphical user interface to indicate their assessment of the input and thus, whether the corresponding unsupervised machine learning model(s) were able to generate the correct result. This feedback information may be used to set or adjust weights associated with the outputs of the various unsupervised machine learning models 122-128 of the ensemble 120, as discussed hereafter. Moreover, in some implementations, the human security analyst may also be provided with outputs indicating that the input to the unsupervised machine learning model is a "normal" or "non-anomalous" input so that the human security analyst may provide such feedback information as well, but this time with regard to whether the input is or is not a threat and thus indicate whether the output of the unsupervised machine learning model(s) represent a true non-threat or a false negative result. In this latter case, such "normal" or "non-anomalous" outputs by the unsupervised machine learning models may be sent to the human security analyst only in instances where the confidence or probability associated with the classification is below a predetermined threshold, such that not all indications of "normal" or "non-anomalous" need be reviewed. The same is true for the "anomaly" or "anomalous" classifications, i.e. a threshold for confidence or probability value may be established and if the confidence/probability for the classification of "anomaly" or "anomalous" is equal to or above the threshold, then the human security analyst may be enlisted to provide feedback information.

As shown in FIG. 1, the outputs of the various unsupervised machine learning models 122-128 may be output to a dynamic weights generator 130 which applies weights 132-136 to the outputs prior to combining the results of the unsupervised machine learning models 122-128 to generate the anomaly score 140. The weights 132-136 are dynamically determined based on feedback information obtained from security analyst review of the outputs of the individual unsupervised machine learning models 122-128, or the final anomaly score 140 generated by a combination of the weighted outputs for the unsupervised machine learning models 122-128. Thus, a first weight W1 132 is applied to the outputs from the first unsupervised machine learning model (the isolation forest model in the depicted example) 122, a second weight W2 134 is applied to the outputs from the second unsupervised machine learning model (the one-class SVM model in the depicted example) 124, and a third weight W3 136 is applied to the outputs from the third unsupervised machine learning model (the local outlier factor model in the depicted example), while the other machine learning models 128 are not included in this particular grouping, as discussed hereafter. It should be appreciated that the weights W1-W3 132-136 may be different from each other due to dynamic modifications of the individual weights 132-136 based on the dynamic weight generator 130 processing feedback information from the security analyst workstation 155 as to the correctness/incorrectness of the anomaly score 140 (or in other embodiments, the individual outputs of the unsupervised machine learning models 122-128 prior to combining them to generate the anomaly score 140.

In combining the weights to generate an initial anomaly score 140, any suitable function for the particular implementation may be used to combine the weighted anomaly scores from the individual unsupervised ML models 122-126 into a single anomaly score for the particular log entry/event that was evaluated by the ensemble 120. For example, the function may be a sum of the individual unsupervised ML models 122-126 scores weighted by the corresponding weights 132-136. In other implementations, an average of the weighted anomaly scores may be utilized. In still other implementations, other functions involving each of the weighted anomaly scores generated by the individual unsupervised ML models 122-126 included in the ensemble 120 may be utilized.

The anomaly score 140 generated by combining the weighted outputs for the various unsupervised machine learning models 122-128 in the ensemble 120 is used to identify input log data that corresponds with anomaly scores 140 indicative of a need for human security analyst review, e.g., logs associated with anomaly scores 140 equal to or above a threshold value. Alternatively, in some illustrative embodiments, a predetermined percentage of log data and corresponding anomaly scores 140 may be selected and provided to the security analyst via the workstation 155 for review. For example, in some illustrative embodiments, a random sampling of the logs and the corresponding anomaly scores 140 may be provided to the security analyst for review.

The anomaly score 140 is used to label the log input data as to the particular classification for the log input data, e.g., "anomaly" or "normal". An anomaly score 140 equal to or above an anomaly threshold value may indicate that the log input data represents an anomaly. An anomaly score 140 below the anomaly threshold may be indicative of log input data that is not anomalous, i.e. is "normal." An additional threshold value may be used to select a subset of the log data inputs indicative of an anomaly that are to be reviewed by the security analyst and also provided as labeled data for inclusion in the partially labeled data 162. For example, a selection threshold value may be set such that a relatively small subset of the log data having high anomaly scores 140, i.e. anomaly scores 140 equal to or above the anomaly threshold value, is selected for obtaining feedback information and for inclusion in the partially labeled data 162, e.g., a small percentage, e.g., approximately 2%, of the log data.

The labeled log data 150, or the selected subset portion thereof, are used to provide the output to the workstation 155 for review by the security analyst 155 who can then either indicate agreement or non-agreement with the labels. This feedback information is fed back into the dynamic weights generator 130 which determines how to modify the weights W1-W3 132-136 to increase the correctness of the anomaly scores 140 and corresponding labels generated by the ensemble 120. That is, some models may operate better on different types of patterns of input data, e.g., different patterns in security log data. As a result, weights may need to be dynamically adjusted based on the patterns of log data input to the ensemble 120. The dynamic weights generator 130 dynamically adjusts the weights 132-136 by receiving the feedback information as to correctness, determining which unsupervised machine learning models 122-128 generated the correct output indicated in the feedback information and which generate the incorrect output. The weights of the unsupervised machine learning models that generate the correct output may be increased whereas the weights of the unsupervised machine learning models may be decreased. The amount of increase/decrease may be determined based on a desired function for the particular implementation.

Furthermore, the security analyst's agreement or non-agreement with the anomaly score 140 output may be used to update performance metrics associated with the unsupervised ML models 122-128 that are part of the ensemble of unsupervised ML models 120 as stored in the metrics storage and ML model selection engine 129. That is, those unsupervised ML models in the ensemble 120 that generated a correct output as indicated by the user feedback may have their performance metric(s) increased to represent that these unsupervised ML models are generating correct results. Those unsupervised ML models in the ensemble 120 that generated an incorrect output as indicated by the user feedback may have their performance metric(s) decreased to represent that these unsupervised ML models are generating incorrect results. The amount of the increase/decrease may be a function of the amount of certainty the corresponding unsupervised ML model had in the output it generated, e.g., more certainty in an incorrect output may result in a larger decrease in the performance metric(s) and more certainty in a correct output may result in a larger increase in the performance metric(s). In other illustrative embodiments, the increase/decrease may be a default or fixed incremental value by which the performance metrics are increased/decreased. In some cases, the performance metrics may be simply a count of the number of times the corresponding unsupervised ML model generated a correct/incorrect output.

In addition to the labeled log data 150 being used to obtain security analyst feedback information, the labeled log data 150 is also stored as part of a partially labeled dataset 162 in a training dataset data storage 160. That is, the partially labeled dataset 162 comprises a selected subset of the labeled log data, i.e. the labeled log data 150 and unlabeled data from the data cleaning and feature engineering engine 110, i.e. the input data to the ensemble 120. The labeled log data 150 that is stored in the partially labeled data 162 will include the correct label for each event or log entry in the labeled log data 150, as indicated either by the ensemble 120 generated initial anomaly score which is approved by the security analyst, or by the security analyst in the user feedback provided by the security analyst, as well as the anomaly score corresponding to the correct label, e.g., the initial anomaly score or an alternative anomaly score generated as a result of the user feedback. That is, if the security analyst reviews a high anomaly score event or log entry in the selected subset of labeled log data 150, and disagrees with the label generated as a result of the initial anomaly score 140, then the security analyst may indicate this disagreement and/or a correct label, and a corresponding default anomaly score will be associated with the event or log entry, e.g., if the security analyst indicates that the high anomaly score is a false positive, then the anomaly score may be changed to a zero anomaly score value which is associated with the correct label of "non-anomalous" in the selected subset of labeled log data 150 that is stored in the partially labeled data 162.

The partially labeled dataset 162 is input to a semi-supervised machine learning model 170 so that the semi-supervised machine learning model 170 labels the unlabeled portion of the partially labeled dataset 162 based on similarities of the unlabeled data with labeled data in the partially labeled data. That is, the semi-supervised machine learning model 170 applies one or more similarity measurement algorithms to the labeled portion and unlabeled portion of the partially labeled data set to determine a measure of similarity between an unlabeled entry in the partially labeled data 162, e.g., an unlabeled log entry, and each of the labeled entries in the partially labeled data 162. The similarity measure is a measure of confidence that the unlabeled entry has similar characteristics as the labeled entry and therefore, should be given a similar label, e.g., "anomalous" or "non-anomalous," as the labeled entry. For example, since each of the entries in the partially labeled dataset 162 have the common format, the fields of the entries may be compared to determine if they store similar content. In the case of textual content in these fields, a cosine similarity measure, Jaccard similarity, Euclidean distance, or any other textual similarity algorithm now known or later developed, may be used to generate a measure of the similarity between the textual contents of the labeled and unlabeled entries. The similarities of the fields may be combined to generate an overall similarity measure of the unlabeled entry to the labeled entry.

This similarity measurement analysis may be performed for each pairing of unlabeled entry and labeled entry in the partially labeled dataset 162. Based on the similarities of the unlabeled entry to the labeled entries, label propagation and label spreading operations are performed such that a labeled entry having a highest similarity measure is selected for the unlabeled entry and the corresponding label of the selected labeled entry is attributed to the unlabeled entry, e.g., log entry in the log data. Thus, if the unlabeled entry is most similar to a labeled entry with the label "anomalous" then the unlabeled entry will likewise be labeled "anomalous" when the semi-supervised learning algorithms 170 update the partially labeled data 162. Similarly, if the unlabeled entry is most similar to a labeled entry with the label of "non-anomalous" then the unlabeled entry will likewise be labeled "non-anomalous." This label propagation and label spreading may be performed with regard to each unlabeled event or log entry in the partially labeled data 162 until all of the events or log entries have a corresponding label.

The semi-supervised machine learning model 170 also updates the anomaly scores for the partially labeled data 162 at least by generating new anomaly scores for the unlabeled events/log entries in the partially labeled data 162 based on the similarity analysis, to generate final anomaly scores 180 for each of the events/log entries in the log data 110. The anomaly scores generated for the unlabeled events/log entries may be generated using any suitable function for the desired implementation. For example, the anomaly scores may be set to the similarity scores generated by the semi-supervised learning algorithms 170 when propagating and spreading the labels. In another implementation, the anomaly scores may be set to a function of these similarity scores, e.g., a function of the similarity score and the anomaly score of the most similar labeled event/log entry in the partially labeled data 162. In other implementations, the anomaly scores may be set to default values based on the label of the most similar labeled event/log entry, e.g., if the label for the most similar labeled event/log entry is "anomalous" then the anomaly score may be set to 0.75, and if it is "non-anomalous" then the anomaly score may be set to 0.25. Any desired function for setting the anomaly score may be used depending on the desired implementation.

For those events indicating anomalies, corresponding logged anomalies are set to the STEM computing system 190 for further evaluation and responsive action. The responsive actions may be any known or later developed responsive action performed by STEM computing systems 190 for addressing potential security threats/attacks.

It should be appreciated that the mechanisms of the illustrative embodiments significantly reduce the amount of manual effort spent on labeling data for training machine learning models. From FIG. 1 it can be seen that the only manual input required is the security analyst review of a selected subset of log data and their labels whose anomaly score 140 meets or exceeds a particular threshold value. For example, the threshold may be set such that only a small percentage of the logs and corresponding labels are sent to the security analyst workstation 155 for review. For example, in some illustrative embodiments, approximately only 2% of the log data and its corresponding labels are sent to the security analyst workstation 155 for review by the security analyst. Moreover, the illustrative embodiments improve the efficiency and effectiveness of detecting security threats/attacks without explicitly defined rules implemented by a rules engine, or searches. Furthermore, the illustrative embodiments reduce the manual effort for identifying false positives and provides a high detection accuracy that improves security coverage.

Figure 2:
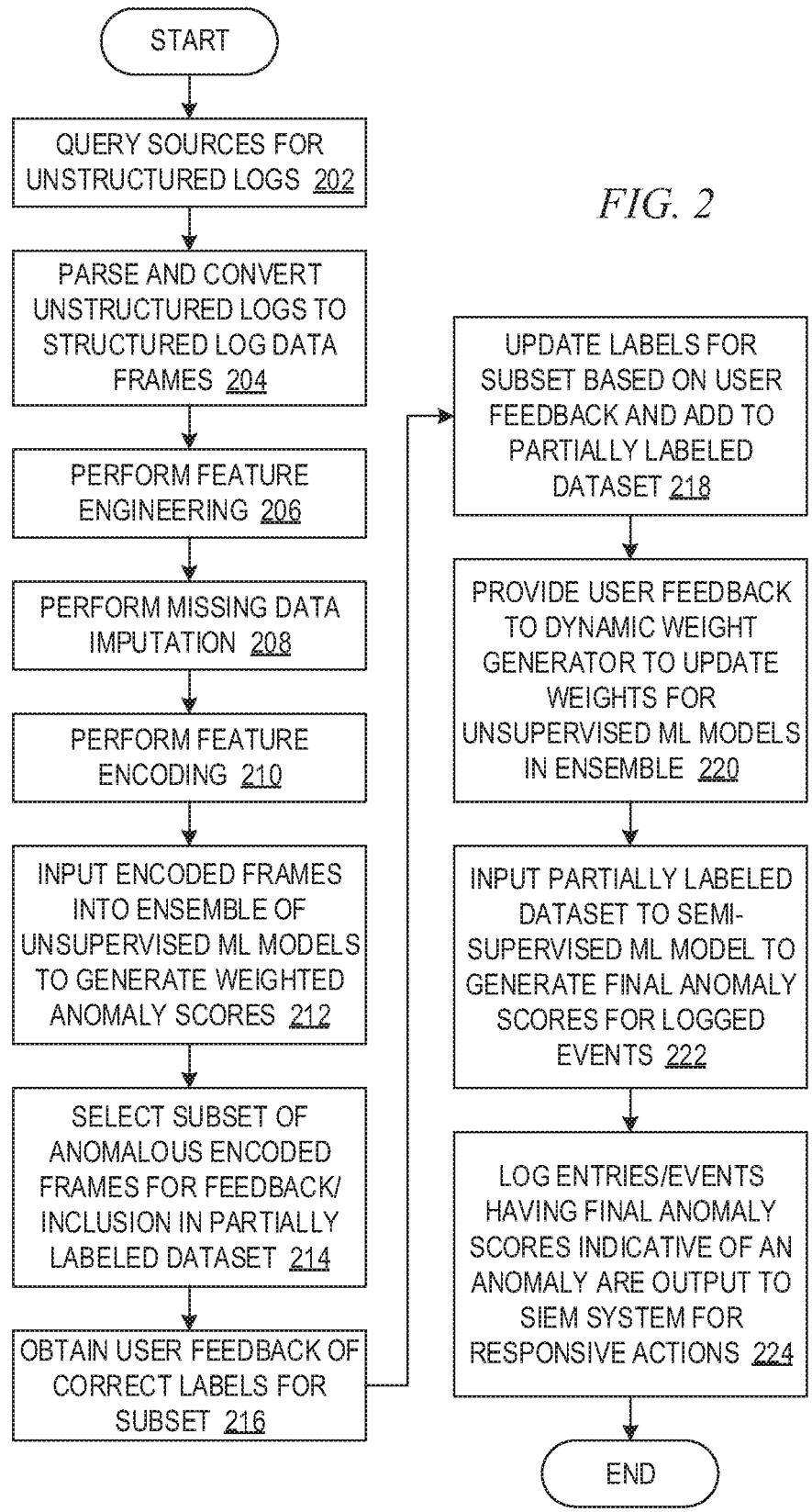
FIG. 2 is a flowchart outlining an example operation of a hybrid ML anomaly detector in accordance with one illustrative embodiment.

FIG. 2 is a flowchart outlining an example operation of a hybrid ML anomaly detector in accordance with one illustrative embodiment. As shown in FIG. 2, the operation starts by having the data cleaning and feature engineering engine query the unstructured logs from various data sources of the monitored computing environment, or other computing system collecting such logs from the monitored computing environment (step 202). The unstructured logs are parsed and converted into structured log data frames (step 204). Feature engineering of the data is performed so as to drop unnecessary features and extract new features to supplement existing features to represent the individual logs (step 206). For example, in some illustrative embodiments, there may be two stages of data pre-processing. The first stage is data transformation which includes operations such as missing value imputation using mean, median, mode or any other suitable imputation methods, categorical variable encoding, one hot encoding, numerical log transformation and other techniques. The second stage of data preprocessing includes engineering new variables from the existing variables. These include temporal transformation (finding time elapsed between two time variables), replacing and/or supplementing variables with frequency counts, creating new variables by counting types within a variable (counting commas), creating new variables by finding distance from mean, replacing infrequent categories within the variables with 'rare', defining new variables which are mathematical transformation of one or more variables showing relationship between two variables, applying enrichment methods to create new variables, and the like. The whole purpose of feature engineering is to establish new variables/features that can explain the observed behavior (target variable) in a better way.

Thus, as examples of this pre-processing and feature engineering (step 206), missing data imputation is performed, such as using a "fillna" algorithm or the like, to impute missing data in the data frame, e.g., geolocation, customer industry, threat category, etc. (step 208). As a further example of this pre-processing, feature encoding is performed (step 210), such as by using a label encoder algorithm to convert categorical variables into numerical values, and a one-hot encoding of those features whose values are lists and not single categorical values.

The encoded log data is input to an ensemble of unsupervised machine learning models which process the encoded log data to generate output anomaly scores that are then weighted and combined to generate an anomaly score for the encoded log data (step 212). The weights applied to the outputs of the various models are dynamically determined based on feedback information as discussed previously. Any suitable function for combining the weighted outputs from the models may be used without departing from the spirit and scope of the present invention, e.g., simply sum, averaging of the weighted anomaly scores from the models, selection of a highest weighted anomaly score from the models, etc.

A subset of the log data having anomaly scores equal to or greater than an anomaly threshold value, is selected for user feedback and inclusion in the partially labeled dataset (step 214). For example, this selection may be based on a comparison of the combined anomaly scores from the models to one or more selection threshold values such that a subset of the anomalous labeled log data is selected, e.g. the high risky logs with anomaly scores above the anomaly threshold value and above the selection threshold value. User feedback information specifying correct labels for the subset of the log data is obtained (step 216) and used to update the labels of this subset before inclusion of the subset as labeled data in the partially labeled dataset (step 218). Moreover, the feedback information is fed back into a dynamic weight generator which updates the weights applied to the outputs of the various unsupervised machine learning models of the ensemble based on whether or not they output a correct result (step 220). The partially labeled dataset, combining the subset of correctly labeled anomalous log data, and the encoded but unlabeled data from the data cleaning and feature engineering engine, is input to a semi-supervised machine learning model which labels unlabeled data based on similarities with the labeled data in the partially labeled dataset (step 222). Log entries or events within the log data that have a resulting final anomaly score as a result of this label propagation indicating anomaly, are output to a SIEM system for further responsive action (step 224). The operation then terminates.

Figure 3:
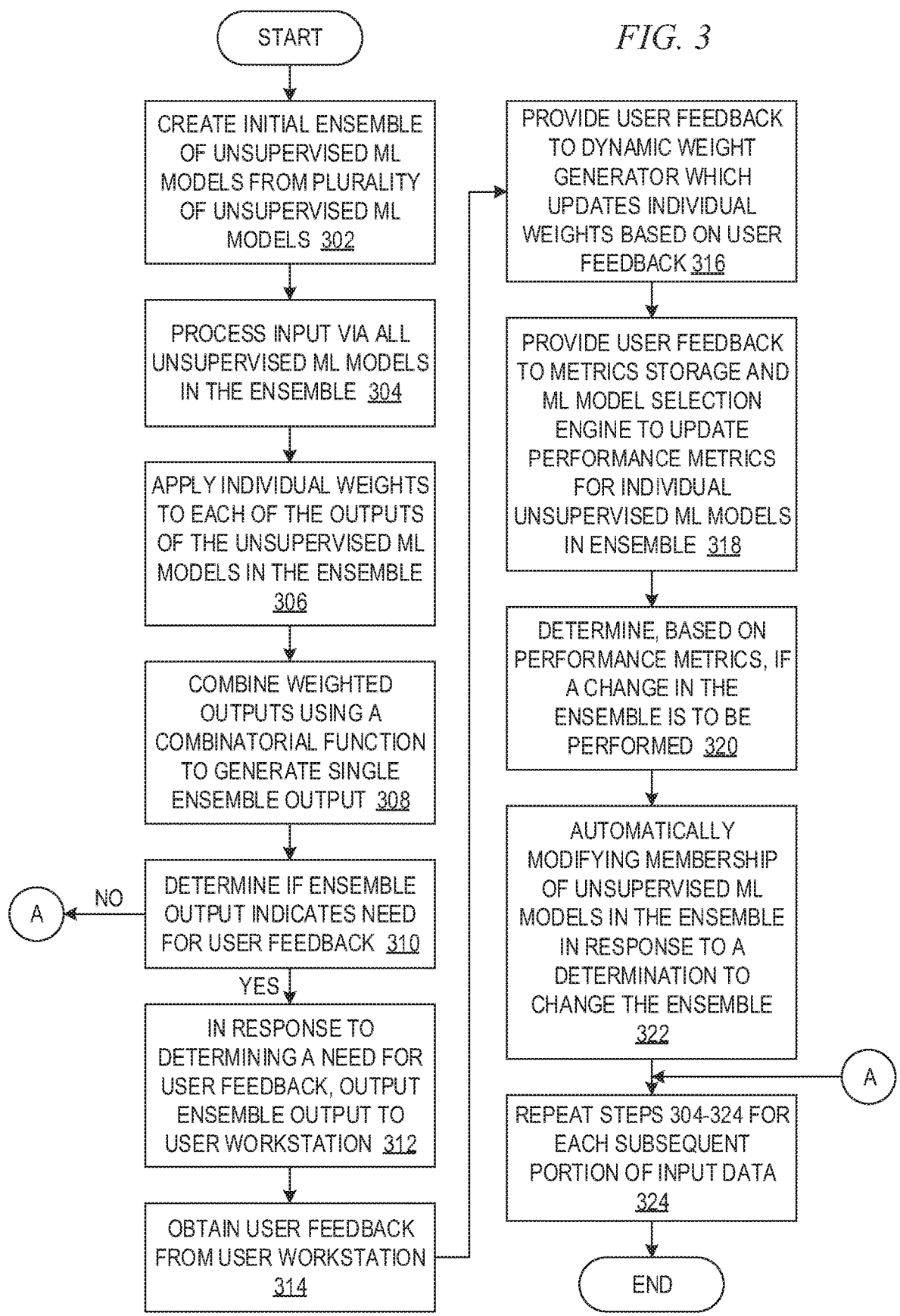
FIG. 3 is a flowchart outlining an example operation for performing machine learning of ensemble weights for AI models in accordance with one illustrative embodiment.

FIG. 3 is a flowchart outlining an example operation for performing machine learning of ensemble weights for AI models in accordance with one illustrative embodiment. The operation outlined in FIG. 3 corresponds to the right hand side of FIG. 1 and the operation of the ensemble of unsupervised ML models and dynamic weight generator, for example, with regard to the selection of unsupervised ML models to include in the ensemble and the adjustment of weights applied to the outputs of the selected unsupervised ML models when combining the outputs to generate a single ensemble output.

As shown in FIG. 3, the operation starts by creating an initial ensemble of unsupervised ML models from a plurality of available unsupervised ML models (step 302). As noted above, this initial selection of unsupervised ML models may be performed by randomly, based on user selections, or any other suitable methodology. Input data is then processed via each of the unsupervised ML models in the ensemble (step 304) and individual weights are applied to each of the outputs of the unsupervised ML models in the ensemble (step 306). The weights may also be set to an initial weight value, which may initially be all the same weight for each of the unsupervised ML models, or may be different based on an estimate as to which unsupervised ML models are more likely than others to provide correct outputs, e.g., based on user input indicating a preference of certain unsupervised ML models over others. Again, the initial setting of weight values may be performed in any suitable manner for the desired implementation. These weight values may then be dynamically and automatically updated based on user feedback as discussed above and set forth hereafter.

The weighted outputs of the individual unsupervised ML models are then combined using a combinatorial function, e.g., a weighted function which applies weights to each of the outputs of each of the unsupervised ML models in the ensemble, to generate a single ensemble output for the ensemble (step 308). A determination is then made as to whether the ensemble output indicates a need for user feedback (step 310). This determination may be, for example, based on a comparison of the ensemble output to one or more criteria, e.g., threshold values or the like. If the one or more criteria are satisfied by the ensemble output, i.e. there is a determined need for user feedback, then the operation may continue with steps 312-324. If the one or more criteria are not satisfied, i.e. user feedback is determined to not be needed, the operation may skip steps 312-324 and continue at step 326.

In response to determining that there is a need for user feedback, the ensemble output is output to a user workstation, such as a computing device associated with an authorized user, e.g., security analyst or the like (step 312). User feedback is then received from the user workstation (step 314). The user feedback indicates a correct output that the ensemble should have generated. For example, the user feedback may indicate agreement with the ensemble output or disagreement with the ensemble output and an indication of what the correct output should have been according to the user's evaluation.

The user feedback is provided to a dynamic weight generator which updates the individual weights based on the user feedback (step 316). For example, based on whether or not the corresponding unsupervised ML model generated a correct output individually, the unsupervised ML model's weight may be increased/decreased to give preference to unsupervised ML models that generate correct outputs and to not give preference to unsupervised ML models that generate incorrect outputs.

In addition, the user feedback is provided to a metrics storage and ML model selection engine to thereby update performance metrics for the individual unsupervised ML models that are part of the ensemble (step 318). Based on the updated performance metrics, a determination is made as to whether a change in the ensemble is to be performed (step 320). This determination may be made based on the performance metrics of unsupervised ML models in the ensemble satisfying one or more criteria for modifying the ensemble, e.g., performance metric(s) of an unsupervised ML model fall to or below a threshold performance value.

In response to a determination that a change in the ensemble is to be performed, membership of the unsupervised ML models in the ensemble is automatically modified (step 322). This modification of the ensemble may include removing unsupervised ML models and/or replacement of the removed unsupervised ML models with other unsupervised ML models that are available for inclusion in the ensemble. The operation of steps 304-322 may then be repeated for each subsequent portion of input data until all portions of the input data have been processed (step 326). The operation then terminates.

Figure 4:
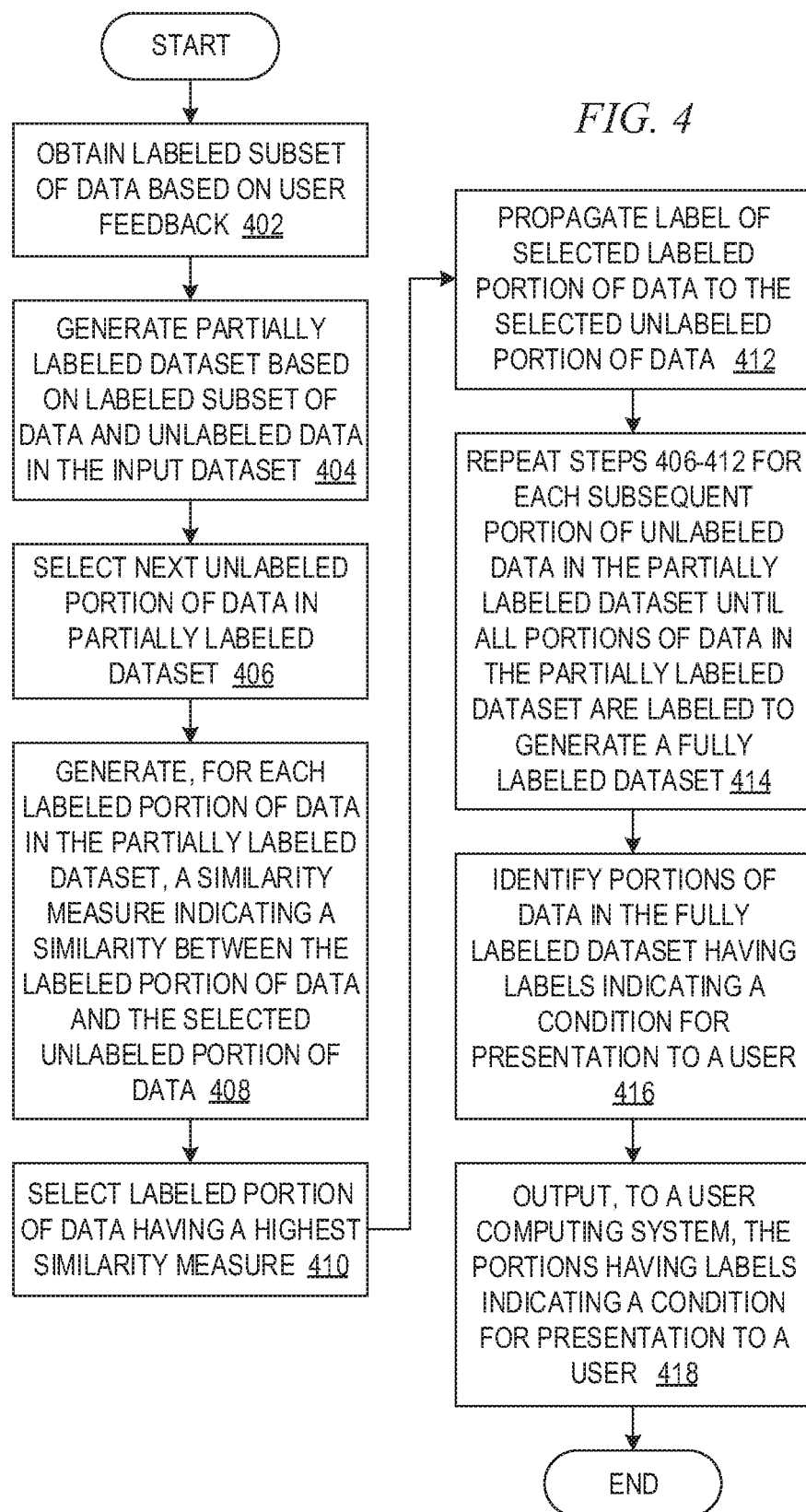
FIG. 4 is a flowchart outlining an example operation for performing propagation and spreading of labels in a partially labeled dataset based on similarity analysis of entries in the partially labeled dataset in accordance with one illustrative embodiment.

FIG. 4 is a flowchart outlining an example operation for performing propagation and spreading of labels in a partially labeled dataset based on similarity analysis of entries in the partially labeled dataset in accordance with one illustrative embodiment. The operation outlined in FIG. 4 corresponds to the left hand side of FIG. 1 and the operation of the semi-supervised ML model(s) with regard to propagating labels within the partially labeled dataset to thereby generate a fully labeled dataset.

As shown in FIG. 4, the operation starts by obtaining a labeled subset of data based on user feedback, such as the user feedback obtained from step 314 for each of the portions of input data (step 402). A partially labeled dataset is generated based on the labeled subset of data and the unlabeled data in the input dataset (step 404). A next unlabeled portion of data in the partially labeled dataset is selected (step 406). Then, for each labeled portion of data in the partially labeled dataset, a similarity measure is generated indicating a similarity between the labeled portion of data and the selected unlabeled portion of data (step 408). A labeled portion of data having a highest similarity measure, indicating a highest similarity with the unlabeled portion of data is selected (step 410).

The label of the selected labeled portion of data is propagated to the selected unlabeled portion of data (step 412). Steps 406-412 are then repeated for each subsequent portion of unlabeled data in the partially labeled dataset until all portions of data in the partially labeled dataset are labeled to generate a fully labeled dataset (step 414).

Portions of data in the fully labeled dataset that have labels indicating a condition for presentation to a user are then identified (step 416). For example, in the case of a hybrid anomaly detector, if the label indicates an anomaly, the corresponding portions of data are identified for presentation to a user. The portions having labels indicating a condition for presentation to a user are then output to the user computing system, e.g., a SIEM system or the like (step 418). The operation then terminates.

Figure 5:
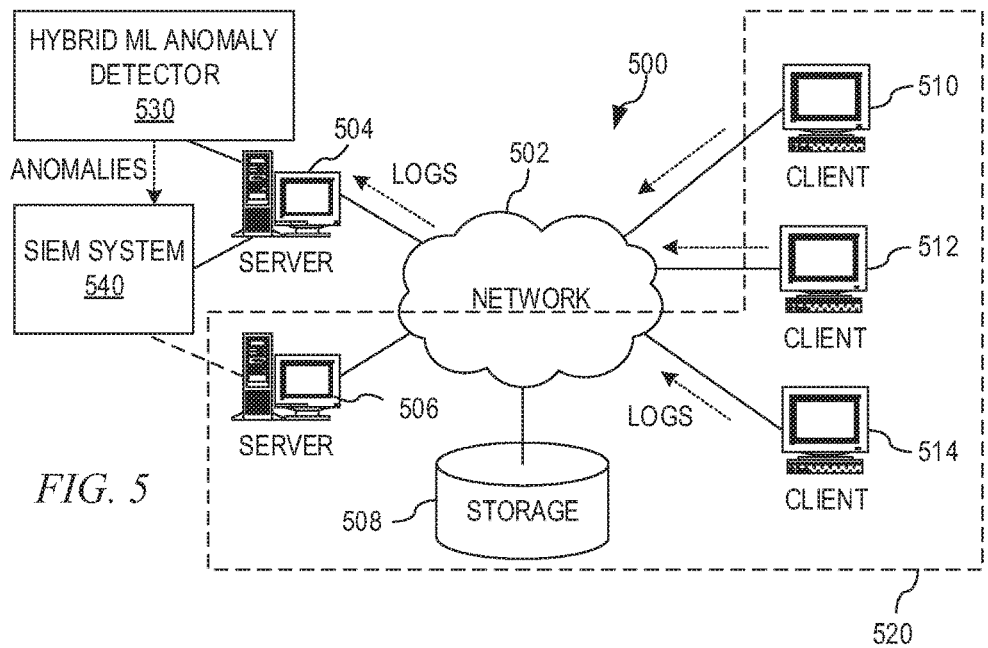
FIG. 5 is an example diagram of a distributed data processing system in which aspects of the illustrative embodiments may be implemented.
Figure 6:
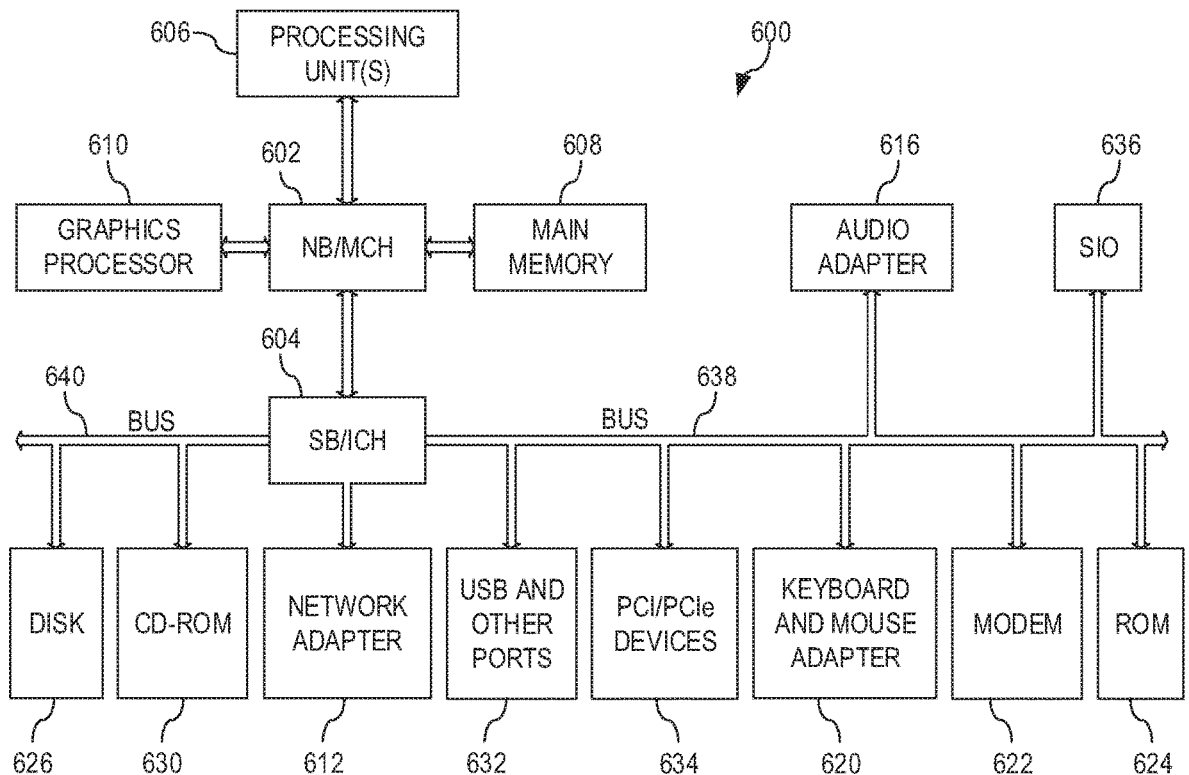
FIG. 6 is an example block diagram of a computing device in which aspects of the illustrative embodiments may be implemented.

From the above description it can be appreciated that the illustrative embodiments may be utilized in many different types of data processing environments. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504, may be specifically configured to implement a hybrid machine learning anomaly detector 530 in accordance with one or more of the illustrative embodiments previously described. For example, the hybrid machine learning anomaly detector 530 may comprise the components shown in FIG. 1 and described above. Moreover, the hybrid machine learning anomaly detector 530 may operate in the manner as described above with regard to FIG. 2, in one or more illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates anomaly detection using a hybrid unsupervised and semi-supervised machine learning computer tool that minimizes human intervention and provides improved accuracy of anomaly detection.

As shown in FIG. 5, a monitored computing system environment 520 may be equipped with monitoring agents (not shown) and other known mechanisms for obtaining computer system security log data (or "logs") which is transmitted to the server 504 via the network 502. For example, this log data may be data that is already routinely sent to the SIEM system 540, which may be implemented and executing on server 504, server 506, or another computing system. For purposes of illustration, it will be assumed that the STEM system 540 is implemented on server 504 which is not part of the monitored computing environment 520, however this is only for illustration purposes and is not intended to be limiting on the present invention. The log data is processed by the hybrid machine learning anomaly detector 530 in the manner previously described above with regard to one or more illustrative embodiments. For example, the log data, which is unstructured log data from the various computing resources of the monitored computing environment 520, e.g., server 506, storage system 508, clients 510-314, and/or the like, is parsed and feature engineering is performed to generate encoded data frames of log data. These encoded data frames of log data are input to the unstructured machine learning model ensemble, such as ensemble 120 of FIG. 1, where a plurality of unsupervised machine learning models operate on the encoded data frames to generate anomaly scores indicating whether the particular model classifies the encoded data frame as anomalous or not anomalous. These individual model scores are weighted according to dynamically generated weighting values and combined to generate an initial anomaly score for the encoded data frame.

The initial anomaly score is compared to a selection threshold to determine whether the corresponding encoded data frame represents an anomaly and the confidence/probability is sufficiently high as to warrant review and feedback from a security analyst. If so, the data frame is output to the security analyst, such as via a workstation or the like, who then provides feedback information indicating a correct label for the encoded data frame. Based on this feedback, the dynamic weights of the unsupervised machine learning models are adjusted. Moreover, the correctly labeled subset of selected anomalous encoded data frames is stored as part of a partially labeled dataset along with the unlabeled encoded data generated by the parsing and feature engineering. This partially labeled dataset is then input to a semi-supervised machine learning model which performs label propagation and spreading based on similarities of the labeled data with the unlabeled data in the partially labeled dataset. The encoded data frames corresponding to anomalous events are then output to the SIEM system 540 for further responsive action.

As noted above, the mechanisms of the illustrative embodiments utilize specifically configured computing devices, or data processing systems, to perform the operations for anomaly detection based on a hybrid machine learning model mechanism and methodology. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM eServer™ System p° computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the hybrid machine learning anomaly detector, e.g., 100 in FIGS. 1 and/or 530 in FIG. 5.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

The illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the memory comprising instructions executed by the at least one processor to cause the at least one processor to implement an ensemble of unsupervised machine learning (ML) models, the method comprising:
   processing, by the ensemble of unsupervised ML models, a portion of input data to generate an ensemble output;
   outputting the ensemble output to an authorized user computing device to obtain user feedback from the authorized user via the user computing device, wherein the user feedback indicates a correctness of the ensemble output;
   modifying at least one feature of the ensemble of unsupervised ML models based on the obtained user feedback to thereby generate a modified ensemble of unsupervised ML models; and
   processing subsequent portions of input data using the modified ensemble of unsupervised ML models.

2. The method of claim 1, further comprising:
   updating at least one performance metric associated with at least one unsupervised ML model in the ensemble based on the user feedback, wherein the at least one performance metric represents at least an accuracy of the at least one unsupervised ML model.

3. The method of claim 1, wherein the at least one feature of the ensemble is a membership of unsupervised ML models in the ensemble, and wherein modifying the at least one feature comprises removing a first unsupervised ML model from the ensemble in response to a performance metric associated with the first unsupervised ML model meeting a predetermined criterion.

4. The method of claim 3, wherein modifying the at least one feature further comprises replacing the first unsupervised ML model with a second unsupervised ML model different from the first unsupervised ML model.

5. The method of claim 1, wherein the at least one feature of the ensemble comprises a weight associated with a first unsupervised ML model in the ensemble that weights an output of the first unsupervised ML model relative to outputs of other unsupervised ML models in the ensemble of unsupervised ML models, and wherein modifying the at least one feature comprises increasing the weight associated with the first unsupervised ML model by a first modification amount in response to the user feedback indicating that the first unsupervised ML model generated a correct output, or decreasing the weight associated with the first unsupervised ML model by a second modification amount in response to the user feedback indicating that the first unsupervised ML model generated an incorrect output.

6. The method of claim 5, wherein at least one of the first modification amount or the second modification amount is determined based on a function of a confidence score, generated by the first unsupervised ML model, in association with an output generated by the first unsupervised ML model.

7. The method of claim 5, wherein at least one of the first modification amount or the second modification amount is a predetermined incremental amount.

8. The method of claim 1, further comprising:
   generating a partially labeled dataset based on a selected subset of entries in the input data for which user feedback is received, and other unlabeled data in the input data;
   performing, by a semi-supervised machine learning model, a similarity analysis of the unlabeled data in the partially labeled dataset with entries in the selected subset of entries; and
   propagating, by the semi-supervised machine learning model, labels of the selected subset of entries to the other unlabeled data based on results of the similarity analysis to thereby generate a fully labeled dataset.

9. The method of claim 8, further comprising:
   identifying, in the fully labeled dataset, a subset of labeled data having corresponding labels indicating that the data is to be output to a user computing system; and
   outputting the subset of labeled data to the user computing device.

10. The method of claim 9, wherein the subset of labeled data comprises labeled data whose labels indicate that the labeled data represents an anomaly, and wherein the user computing device is a security incident and event management (SIEM) computing system.

11. A computer program product comprising a computer readable storage medium having a computer readable program stored therein, wherein the computer readable program, when executed on a computing device, causes the computing device to be specifically configured to implement an ensemble of unsupervised machine learning (ML) models and to:
   process, by the ensemble of unsupervised ML models, a portion of input data to generate an ensemble output;
   output the ensemble output to an authorized user computing device to obtain user feedback from the authorized user via the user computing device, wherein the user feedback indicates a correctness of the ensemble output;
   modify at least one feature of the ensemble of unsupervised ML models based on the obtained user feedback to thereby generate a modified ensemble of unsupervised ML models; and
   process subsequent portions of input data using the modified ensemble of unsupervised ML models.

12. The computer program product of claim 11, wherein the computer readable program further causes the computing device to:
   update at least one performance metric associated with at least one unsupervised ML model in the ensemble based on the user feedback, wherein the at least one performance metric represents at least an accuracy of the at least one unsupervised ML model.

13. The computer program product of claim 11, wherein the at least one feature of the ensemble is a membership of unsupervised ML models in the ensemble, and wherein modifying the at least one feature comprises removing a first unsupervised ML model from the ensemble in response to a performance metric associated with the first unsupervised ML model meeting a predetermined criterion.

14. The computer program product of claim 13, wherein modifying the at least one feature further comprises replacing the first unsupervised ML model with a second unsupervised ML model different from the first unsupervised ML model.

15. The computer program product of claim 11, wherein the at least one feature of the ensemble comprises a weight associated with a first unsupervised ML model in the ensemble that weights an output of the first unsupervised ML model relative to outputs of other unsupervised ML models in the ensemble of unsupervised ML models, and wherein modifying the at least one feature comprises increasing the weight associated with the first unsupervised ML model by a first modification amount in response to the user feedback indicating that the first unsupervised ML model generated a correct output, or decreasing the weight associated with the first unsupervised ML model by a second modification amount in response to the user feedback indicating that the first unsupervised ML model generated an incorrect output.

16. The computer program product of claim 15, wherein at least one of the first modification amount or the second modification amount is determined based on a function of a confidence score, generated by the first unsupervised ML model, in association with an output generated by the first unsupervised ML model.

17. The computer program product of claim 15, wherein at least one of the first modification amount or the second modification amount is a predetermined incremental amount.

18. The computer program product of claim 11, wherein the computer readable program further causes the computing device to:
  generate a partially labeled dataset based on a selected subset of entries in the input data for which user feedback is received, and other unlabeled data in the input data;
  perform, by a semi-supervised machine learning model, a similarity analysis of the unlabeled data in the partially labeled dataset with entries in the selected subset of entries; and
  propagate, by the semi-supervised machine learning model, labels of the selected subset of entries to the other unlabeled data based on results of the similarity analysis to thereby generate a fully labeled dataset.

19. The computer program product of claim 18, wherein the computer readable program further causes the computing device to:
  identify, in the fully labeled dataset, a subset of labeled data having corresponding labels indicating that the data is to be output to a user computing system; and
  output the subset of labeled data to the user computing device.

20. An apparatus comprising:
  at least one processor; and
  at least one memory coupled to the at least one processor, wherein the at least one memory comprises instructions which, when executed by the at least one processor, cause the at least one processor to be specifically configured to implement an ensemble of unsupervised machine learning (ML) models and to:
  process, by the ensemble of unsupervised ML models, a portion of input data to generate an ensemble output;
  output the ensemble output to an authorized user computing device to obtain user feedback from the authorized user via the user computing device, wherein the user feedback indicates a correctness of the ensemble output;
  modify at least one feature of the ensemble of unsupervised ML models based on the obtained user feedback to thereby generate a modified ensemble of unsupervised ML models; and
  process subsequent portions of input data using the modified ensemble of unsupervised ML models.

* * * * *